United States Patent [19]

Elmore

[11] Patent Number: 5,051,500

[45] Date of Patent: Sep. 24, 1991

[54] METHOD OF PREPARING A RANDOMLY-BONDED POLYSACCHARIDE

[75] Inventor: Roy O. Elmore, Atwood, Ill.

[73] Assignee: A. E. Staley Manufacturing Company, Decatur, Ill.

[21] Appl. No.: 392,735

[22] Filed: Aug. 11, 1989

[51] Int. Cl.$^5$ .................... C08B 37/00; A23L 1/308
[52] U.S. Cl. ...................................... 536/50; 536/124
[58] Field of Search ................................ 536/50, 124

[56] References Cited

U.S. PATENT DOCUMENTS

| | | | |
|---|---|---|---|
| 3,486,469 | 12/1969 | Recas | 127/58 |
| 3,766,165 | 10/1973 | Rennhard | 536/1.1 |
| 3,876,794 | 4/1975 | Rennhard | 426/152 |

FOREIGN PATENT DOCUMENTS 0404735 12/1990 European Pat. Off. .

OTHER PUBLICATIONS

Technical Bulletin, "Pfizer Polydextrose for the Market That's Shaping Up", pp. 1–14 (Pfizer, Inc., 1985).
"MP2000MB Masterbatch Twin Screw Compounding Extruder", a technical bulletin published by Baker Perkins Polymer Machinery Division, Baker Perkins Chemical Machinery Ltd., Stoke-on-Trent, England.
"Poly-Con ® Continuous Reactors", a technical bulletin published by Baker Perkins Polymer Machinery Division, Baker Perkins Chemical Machinery Ltd., Stoke-on-Trent, England.
"MP2000 Series Technical Compounding Systems", a technical bulletin published by APV Chemical Machinery Ltd., Stoke-on-Trent, England.
S. B. Brown and C. M. Orlando, "Reactive Extrusion", *Encyclopedia of Polymer Science and Engineering*, vol. 14, pp. 169–189 (John Wiley & Sons, Inc., New York, N.Y., 2 ed., 1988).
"Melt Extrusion", *Encyclopedia of Polymer Science and Technology*, vol. 8, pp. 533–587 (John Wiley & Sons, Inc., New York, N.Y., 1st ed., 1968).
*Encyclopedia of Chemical Technology*, vol. 15, pp. 630–637 (John Wiley & Sons, Inc., New York, N.Y., 3d ed., 1981).
"Continuous Processor", a technical bulletin published by Teledyne Readco, York, PA.
"Co-Rotating TX Twin Screw Food Extruder", a technical bulletin published by Wenger Mfg., Inc., Sabetha, KS.
"The Extra Heavy Duty Continuous Processor", a technical bulletin published by Teledyne Readco, York, PA.

*Primary Examiner*—Nathan M. Nutter
*Attorney, Agent, or Firm*—Michael F. Campbell; J. Daniel Wood

[57] ABSTRACT

A method of preparing a bulking agent useful in the replacement of carbohydrates and/or fats is provided. The bulking agent is comprised of a randomly-bonded polysacchardie prepared from a granular reducing saccharide and a granular edible polyol by means of an apparatus having a vented chamber with means for conveying the ingredients longitudinally through said chamber with lateral mixing of said ingredients and minimal longitudinal mixing of said ingredients.

7 Claims, No Drawings

METHOD OF PREPARING A RANDOMLY-BONDED POLYSACCHARIDE

FIELD OF THE INVENTION

This invention relates to the preparation of randomly-bonded polysaccharide bulking agents useful in the production of food products.

BACKGROUND OF THE INVENTION

The use of reduced calorie materials as bulking agents in place of one or more traditional or conventional ingredients is known. For example, polydextrose has been promoted to replace a portion of the sugar and/or fat in a variety of food products. The technical bulletin "Pfizer Polydextrose for the Market That's Shaping Up", pp. 1-14 (Pfizer, Inc., 1985), recites formulas for different food products in which polydextrose was used to replace a minor portion of the sucrose and/or fat in the formulation. The bulletin states that polydextrose is available as a powder having residual acidity or as an aqueous solution at 70% solids neutralized to a pH of 5 to 6.

U.S. Pat. Nos. 3,766,165 and 3,876,794 (each to Rennhard) disclose the preparation and use of both soluble and insoluble polyglucoses and polymaltoses. It is disclosed in Example II of each Rennhard patent that a preblend of dextrose monohydrate, sorbitol monohydrate and tartaric acid were melted in a steam-jacketed screw conveyor and continuously fed to a vacuum-operated, continuous double-arm mixer for a continuous melt polymerization.

SUMMARY OF THE INVENTION

This invention relates to a continuous method of preparing a randomly-bonded polysaccharide comprising:

feeding ingredients comprising a reducing saccharide and an edible carboxylic acid, each as a separate stream in solid particulate form, into a vented chamber having means for conveying said ingredients longitudinally through said chamber with lateral mixing of said ingredients and minimal longitudinal mixing of said ingredients, melting and laterally mixing said ingredients in a first zone of said chamber to form a melt, conveying said melt within said chamber by said means for conveying to a second zone of said chamber, reacting said melt in said second zone of said chamber to form a randomly-bonded polysaccharide in said melt, conveying said melt through said second zone by said means for conveying, and subjecting said melt while in said second zone to reduced pressure and agitating said melt to remove water from said melt.

By "minimal longitudinal mixing" is meant an apparatus reactor with a chamber having means which exhibit minimal mixing along the path of conveyance of the ingredients through the chamber, i.e., less mixing than a double-arm mixer as employed in Example II of the Rennhard patents. An example of such an apparatus is an extruder having co-rotating screws which provide minimal longitudinal mixing, but excellent lateral mixing, and thereby promote both product homogeneity (i.e., reduced polydispersity) and reaction rate, the latter by facilitating the removal of water of condensation.

DETAILED DESCRIPTION OF THE INVENTION

The randomly-bonded polysaccharide component prepared by the method of this invention is a polymer comprised of randomly-bonded saccharide units. The polymer is produced by the acid-catalyzed polymerization of reducing saccharides of one or more sources thereof. The linkages between saccharide units which predominate in the polymer are primarily 1→6 linkages, but other linkages also occur. The number average molecular weight will generally range from about 1,000 g/mole to about 36,000 g/mole. These polysaccharides are generally unaffected by amylolytic enzymes such as amylo(1,4)glucosidases, amylo(1,4; 1,6)glucosidases, amylo(1,4)dextrinases, and amylo(1,4)maltosidases as well as alpha- and beta-glucosidases, sucrase and phosphorylase. Thus, they are substantially inert to digestion by mammalian enzymes, although mammalian intestinal flora may be able to ferment a portion of the polysaccharide and make fermentation products available for digestion by mammals.

It will be understood that the terms polyglucose, polymaltose and polysaccharide, as used in describing this invention, are intended to denominate randomly-bonded polymeric materials in which the majority of monomeric moieties are glucose, maltose or other reducing saccharide, as well as polymeric materials in which the glucose, maltose or saccharide moieties are esterified with moieties derived from carboxylic acids used as reactive catalysts.

The ingredients used as starting materials in the melt polymerization process comprise maltose or glucose, although other simple sugars may be used as well. The sugars, carboxylic acids and polyols (discussed below) are supplied to the process as separate streams of dry anhydrides or dry hydrated solids and are in particulate form, e.g., granular (such as particles within the range of 150-840 micrometers).

The method of this invention employs a vented chamber having means for conveying ingredients longitudinally through said chamber. By implication, the chamber is elongated and thus has a longitudinal axis and a lateral axis. Situated along the longitudinal axis, the chamber has at least two zones which may overlap to the point of almost complete coincidence. Means may be employed to segregate the second zone from the first zone and thereby facilitate the maintenance of reduced pressure in said second zone. Examples of such means include melt sealing of the boundaries of the second zone, for example by changes in the channel depth (e.g., an increase in channel depth in the second zone) and/or screw geometry. The first zone is associated with means to melt the ingredients. Such means will typically comprise a heating jacket surrounding the exterior of the chamber in this zone. A heating medium, typically pressurized steam, is typically circulated through said jacket to provide heat to said first zone, although other means of heating said first zone may be useful.

The chamber has means for conveying ingredients longitudinally through said chamber along the longitudinal axis from the point of feed. Such means also provide lateral mixing of the ingredients with minimal longitudinal mixing. An example of such means are co-rotating screws, but other means may be useful.

The chamber has a second zone in which the ingredients react to form a randomly-bonded polysaccharide. The reaction is promoted by heating of the melt and reducing the pressure in said second zone to thereby remove water, as a vapor, therefrom. The ingredients are agitated, preferably by continued lateral mixing but with minimal longitudinal mixing, to facilitate the removal of water from the melt.

An example of an apparatus useful in the practice of this invention is a twin-screw extruder having co-rotating screws, vacuum vent ports and a length to diameter ratio in the range of about 10/1 to 40/1. Such an apparatus is commercially available as a Poly-Con TM continuous reactor from Baker Perkins Div. of APV Chemical Machinery, Inc., Saginaw, MI. This apparatus is most advantageously employed in the method of this invention with continuous weigh feeders which are adjusted to feed the ingredients in solid particulate form to the feed hopper of the apparatus.

The ingredients comprise one or more edible carboxylic acids as a catalyst. The acids used as catalysts, crosslinking agents or polymerization activators may be any one of a series of edible acids. In particular, it is preferred to use citric, fumaric, tartaric, succinic, adipic, itaconic or terephthalic acids. The anhydrides of succinic, adipic, and itaconic acids may also be used. The acid or anhydride must be food-acceptable, that is, palatable and free of significant adverse effect at the level of ordinary use. Inedible acids, while chemically suitable to the process, are not suitable for use in the production of edible polyglucoses or polymaltoses. Therefore, the selection of the acid catalyst to be used must be guided by the needs of human non-toxicity. Inorganic acids may not be suitable for use as acid catalysts in anhydrous melt polymerization since they may not serve as crosslinking agents in the production of the insoluble polyglucoses and polymaltoses. However, the use of small amounts of inorganic acids, e.g., a mineral acid such as hydrochloric acid, as a promoter may desirably increase the rate of reaction. Monocarboxylic acids will not act as a comonomer and may not be effective as crosslinking agents and will not be as satisfactory as polycarboxylic acids as catalysts in anhydrous melt polymerization. The acid selected should be relatively non-volatile, since more volatile acids may be vaporized during the heating and melting processes by which the mixture is polymerized. The polycarboxylic acids used are largely, but incompletely, esterified with the polyglucose or polymaltose in the polymerizing process, forming acid polyglucose esters or acid polymaltose esters. This is evidenced by the residual acidity of the polyglucoses and polymaltoses after dialysis, and the recovery of the acid upon hydrolysis of the product. The incorporation of the acid moieties within the polyglucoses or polymaltoses does not affect their suitability for human consumption.

The acid moieties are likely to serve as crosslinking agents between different polyglucose or polymaltose molecules in the insoluble polymers whereas, in the soluble polymers, each acid moiety is more likely to be esterified to only the polymer molecule.

The performance of this melt polymerization involves the steps of combining the dry powdered glucose or maltose with the proper amount of acid; the heating and melting of the glucose or maltose and the acid under reduced pressure; the maintenance of the molten conditions in the absence of water until substantial polymerization occurs; and the separation of the individual polymeric product types.

The anhydrous melt polymerization must be carried out at a pressure below atmospheric pressure. The preferred pressures do not exceed about 300 mm, e.g., from about $10^{-5}$ to 100-300 mm Hg, and can be obtained by the use of a vacuum pump, a steam jet ejector, an aspirator or by other means. The vacuum is required in order to exclude air from the polymerization and to remove the water of hydration and the water liberated in the polymerization reaction. Air should be excluded from the environment of the polymerizing mixture in order to minimize decomposition and discoloration of the polyglucoses or polymaltoses formed in the polymerization. A fine stream of nitrogen has also been found to be useful with this invention as a method for excluding air and removing the waters of hydration and polymerization which are formed. Where the nitrogen purge is used, the vacuum requirements are lessened but pressures of 100-300 mm Hg or less are still preferred.

The duration of the reaction and the reaction temperature are interdependent variables in the operation of this invention. A preferable temperature for the melt polymerization in the laboratory is from about 140° C. to about 180° C. The precise temperature for the anhydrous melt polymerization depends on the initial ratio of glucose, maltose or other sugars to the acid which is used, the reaction time and the proportion of soluble polyglucoses or polymaltoses to insoluble, crosslinked polyglucoses or polymaltoses which is desired in the final product mixture.

The production of a large portion of soluble glucose or maltose polymers usually requires a concentration of acid catalyst between about 0.1 and 10 mole percent, and it is preferred to use between 0.5 and 5 percent. As the amount of acid is increased, the degree of acid crosslinking increases and the proportion of water-insoluble polyglucose or polymaltose increases. Where acid concentrations are unnecessarily high, problems may arise with regard to neutralizing the excess acid which is present in the final product mixture. As those skilled in the art will perceive, the amount of acid required for a particular polymerization, the polymerization duration, the polymerization temperature and the nature of the products desired are all interdependent. The selection of the amount of acid to be used in this invention should take account of these factors.

The thermal exposure (reaction time and temperature) used in the production of soluble polyglucoses or polymaltoses by melt polymerization should be as low as possible, since discoloration, caramelization and degradation increase with prolonged exposure to high temperature. Fortunately, however, as the temperature of the polymerization is increased, the time required to achieve substantially complete polymerization decreases. Therefore, the process of this invention may be conducted at temperatures in the range of about 200°-300° C. in about 10 minutes or less without significant darkening, under vacuum of course.

In the production of insoluble polyglucoses or polymaltoses, the molar ratio of glucose or maltose to acid may also be within the ranges specified above for production of the soluble polysaccharides, and especially about 2.5-10 mole percent of acid. It is preferred, however, in the performance of this invention to use a molar ratio of glucose or maltose to acid between about 12:1 and 20:1 in the production of insoluble polyglucose or polymaltose. These ratios are preferred in spite of the requirements of high reaction temperature and relatively long reaction times because the total yield of soluble and insoluble polyglucoses or polymaltoses is between 90 and 99 percent at these sugar to acid ratios.

Thus, using these higher ratios, it is possible to produce in one reaction mixture a yield of between about 50 and 60 percent of insoluble polyglucose or polymaltose and of between about 40 and 50 percent of soluble polyglucose or polymaltose. The water-soluble polyglucose or polymaltose can be separated from the insoluble polyglucose or polymaltose contained in the reaction mixture by extraction with water and subsequent centrifugation. An additional important advantage of performing the reaction at high molar ratios of glucose or maltose to acid derives from the fact that the resultant products require little or no neutralization, where neutralization of excess acid levels introduces salt concentrations unacceptable in product for use in foods.

The inclusion of an edible polyol (also preferably in solid particulate form), such as sorbitol in the saccharide-carboxylic acid reaction mixtures prior to polycondensation yields superior products. In most cases, 90% or more of the polyol cannot be isolated from the condensation product, demonstrating that it has been chemically incorporated in the polymer. These additives function as internal plasticizers to reduce viscosity, and also provide improved color and taste. This is evident, for example, in the manufacture of hard candy from such condensation polymers, where the rheological properties of the melt are improved during processing, foaming is minimized, and a better tasting product of lighter color is obtained. In addition to sorbitol, other food-acceptable polyols include glycerol, erythritol, xylitol, mannitol and galactitol. Polyol concentrations of from about 5 to 20% by weight of the total reaction mixture provide such advantages, and levels of about 8 to 12% by weight are preferred.

Chemical purification is not generally required for the products of this invention. Where insoluble and soluble glucoses or maltoses are produced together, separation may be required.

Neutralization of the polyglucoses or polymaltoses may be desirable for certain applications, despite the very low levels of acid catalyst which are employed. For example, where the polyglucoses are to be used in dietetic foods containing whole milk, excess acid which may be present in the unneutralized polyglucoses will tend to curdle the milk. In the case of the soluble polyglucoses or polymaltoses, solutions of the polyglucoses or polymaltoses are neutralized directly. This neutralization may be accomplished by adding carbonates or bicarbonates of potassium, sodium, calcium or magnesium to solutions of polyglucose or polymaltose. Where sodium and potassium are used together, a physiologically balanced mixture may be used. The salt content of a typical polyglucose solution which has been adjusted to a pH of about 5 to 6 should be about 0.5 to 1.0 percent. Other materials which may be used to adjust the pH of soluble polyglucose or polymaltose solutions include L-lysine, d-glucosamine, N-methyl glucamine and ammonium hydroxide. The first two of these compounds are natural materials and should not be objectionable as an ingredient of dietetic foods and the last compound, which is rapidly excreted by the body in the form of urea, would not be objectionable as an ingredient in dietetic foods. N-methyl glucamine is used as a solubilizing agent for pharmaceuticals and should not be objectionable as an ingredient in dietetic foods. Other methods for reducing the acidity of polyglucose or polymaltose solutions are dialysis and ion exchange.

Decolorization of the soluble and insoluble polyglucoses and polymaltoses useful in this invention is often desirable for certain uses, despite their inherently light color as produced. Soluble polyglucose or polymaltose may be decolorized by contacting a soluble of the polyglucose or polymaltose with activated carbon or charcoal, by slurrying or by passing the solution through a bed of the solid adsorbent. Soluble and insoluble polyglucoses and polymaltoses may be bleached with sodium chlorite, hydrogen peroxide or similar materials which are used for bleaching flour. The insoluble polyglucose is a yellow material and often does not require bleaching at all.

The solutions of soluble polyglucose or polymaltose are almost tasteless and the insoluble polyglucose is a bland-tasting material.

Most of the polyglucoses produced by the melt polymerization should have an average molecular weight from about 1,500 to about 36,000. The soluble polyglucoses will generally have an average molecular weight from about 1,500 to about 18,000 and the insoluble polyglucoses will generally have an average molecular weight between about 6,000 and about 36,000. The polyglucoses should contain a major portion by weight of polymer chains having a degree of polymerization of at least four (i.e., more than 50% by weight DP4+), and more preferably at least about 65%.

The randomly-bonded polysaccharide preferred for manufacture in accordance with this invention is polydextrose. Polydextrose is defined by federal regulations as a partially metabolizable water-soluble polymer prepared from D-glucose with small amounts of sorbitol and citric acid, which polymer may be partially neutralized with potassium hydroxide. Polydextrose is commercially available from Pfizer, Inc. as a composition comprised of greater than 90% polymer, less than 4% each of glucose and levoglucosan and less than 2% sorbitol. The acid form is commercially available as a dry powder having less than 4% water. Neutralized polydextrose is available as a 70% dry solids solution with a pH of from 5 to 6. This neutralized solution can be treated to remove water and yeild a dry material, e.g., by evaporation of the water at elevated temperatures and/or reduced pressures.

EXAMPLE

Granular dextrose, granular sorbitol, granular citric acid, and aqueous hydrochloric acid (18M) are continuously metered through weigh feeders at a rate of 100 parts by weight (pbw/hr), 10 pbw/hr, 1 pbw/hr, and 0.005 pbw/hr, respectively. The ingredients are fed to the hopper of an MP2000MB Masterbatch twin screw compounding extruder or a Poly-Con ™ continuous reactor from APV Chemical Machinery, Inc., each having length to diameter ratio of 20/1 or 30/1. These apparatus each have twin co-rotating screws in an elongated chamber and a heating jacket about the chamber which mix and melt the ingredients in a first zone while conveing the ingredient through the chamber. A second zone of the chamber is subjected to a reduced pressure of 10–25 inches of Hg and is maintained at a temperature between 300° F. and 400° F. Water is removed from the chamber as vapor through a vacuum vent port. The product discharged from the reactor is a polymerized dextrose which should contain at least 65–70% of polydextrose having a degree of polymerization greater than four.

What is claimed is:

1. A continuous method of preparing a randomly-bonded polysaccharide comprising:

feeding ingredients comprising a reducing saccharide, said reducing saccharide being selected from the group consisting of glucose and maltose, and an edible carboxylic acid, each as a separate stream in solid particulate form, into a vented chamber having means for conveying said ingredients longitudinally through said chamber with lateral mixing of said ingredients and minimal longitudinal mixing of said ingredients, melting and laterally mixing said ingredients in a first zone of said chamber to form a melt, conveying said melt within said chamber by said means for conveying to a second zone of said chamber, reacting said melt in said second zone of said chamber to form a randomly-bonded polysaccharide in said melt, conveying said melt through said second zone by said means for conveying, and subjecting said melt while in said second zone to reduced pressure and agitating said melt to remove water from said melt.

2. A method of claim 1 wherein said reducing saccharide is glucose.

3. A method of claim 1 wherein said edible carboxylic acid is citric acid.

4. A method of claim 1 wherein said ingredients further comprise sorbitol.

5. A method of claim 1 wherein said means for conveying comprise co-rotating screws.

6. A method of claim 1 wherein said chamber is the barrel of a twin screw extruder and said means for conveying are twin co-rotating screws.

7. A continuous method of preparing a randomly-bonded polysaccharide comprising:

feeding ingredients comprising glucose, citric acid, and sorbitol, each as a separate stream in solid particulate form, into a vented chamber having means for conveying said ingredients through said chamber with lateral mixing of said ingredients and minimal longitudinal mixing of said ingredients, wherein said means comprise co-rotating screws, melting and laterally mixing said ingredients in a first zone of said chamber to form a melt, conveying said melt within said chamber by said means for conveying to a second zone of said chamber, reacting said melt in said second zone of said chamber to form a randomly-bonded polysaccharide in said melt, conveying said melt through said second zone by said means for conveying, and subjecting said melt while in said second zone to reduced pressure and agitating said melt to remove water from said melt.

* * * * *